US008229050B2

(12) United States Patent
Lopez et al.

(10) Patent No.: US 8,229,050 B2
(45) Date of Patent: Jul. 24, 2012

(54) METHOD AND ARRANGEMENT FOR IMPROVED MODEL ORDER SELECTION

(75) Inventors: Miguel Lopez, Solna (SE); Gustav Almqvist, Jarfalla (SE); Tomas Andersson, Solna (SE); Dennis Hui, Cary, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 321 days.

(21) Appl. No.: 12/601,568

(22) PCT Filed: May 28, 2007

(86) PCT No.: PCT/SE2007/050360
§ 371 (c)(1),
(2), (4) Date: Nov. 24, 2009

(87) PCT Pub. No.: WO2008/147261
PCT Pub. Date: Dec. 4, 2008

(65) Prior Publication Data
US 2010/0167679 A1    Jul. 1, 2010

(51) Int. Cl.
*H04L 7/00*   (2006.01)
*H04K 3/00*   (2006.01)
(52) U.S. Cl. .................................. 375/354; 455/296
(58) Field of Classification Search ........... 375/340, 375/350, 354; 455/67.11, 296
See application file for complete search history.

(56) References Cited

U.S. PATENT DOCUMENTS
2010/0248666 A1*  9/2010  Hui et al. ............... 455/208

FOREIGN PATENT DOCUMENTS
WO      2006/136875 A1    12/2006

OTHER PUBLICATIONS
Pappas, S. S. et al. "Joint Order and Parameter Estimation of Multivariate Autoregressive Models using Multi-Model Partitioning Theory." Digital Signal Processing archive, vol. 16, Issue 6, Nov. 2006, pp. 782-795.
Nicoli, M. et al. "Reduced-Rank Channel Estimation for Time-Slotted Mobile Communication Systems." IEEE Transactions on Signal Processing, vol. 53, No. 3, Mar. 2005, pp. 926-944.
Wang, X. et al. "OFDM Channel Estimation Based on Time-Frequency Polynomial Model of Fading Multipath Channel." IEEE Global Telecommunications Conference, 2001, vol. 1, pp. 212-216.

* cited by examiner

*Primary Examiner* — Lee Nguyen
(74) *Attorney, Agent, or Firm* — Coats & Bennett, P.L.L.C.

(57) ABSTRACT

In a method of enabling model order selection for joint channel synchronization and noise covariance estimation of at least one received signal in a wireless communication network, generating S0 a spatially and temporally stacked signal model by stacking successive samples of temporally adjacent received signal vectors and corresponding training vectors, computing S1 a noise variance matrix for each hypothesized synchronization position, channel length and stacking order, based on the stacked training symbols: determining S2 a best synchronization position for the received signal, based on the stacked training vectors, by jointly determining the best synchronization position for the received signal and estimating a channel length and a stacking order for said signal model based on the stacked training vectors.

11 Claims, 6 Drawing Sheets

METHOD AND ARRANGEMENT FOR IMPROVED MODEL ORDER SELECTION

TECHNICAL FIELD

The present invention concerns wireless telecommunication systems in general, and specifically methods and arrangements for improved model order selection for joint synchronization, channel estimation and noise covariance estimation in such systems.

BACKGROUND

The growing popularity of mobile services has resulted in ever-increasing interference levels caused by the closer proximity of users, and in the case of time division multiple access (TDMA) based systems by a tighter frequency reuse. As a result, mutual interference among users occupying the same radio channel has become a major source of signal disturbance. The ability to suppress co-channel interference has become increasingly important for mobile receivers in cellular systems with tight reuse. This has led to the development of several techniques for interference suppression in the receiver units of the base transceiver stations (BTS) or mobile stations (MS).

Multi-branch diversity or array processing is a class of commonly used techniques for suppressing interference, in which multiple versions of the same transmitted signal are produced and processed jointly in the receiver in order to cancel one or more interfering signals. The different signal versions may be obtained by using multiple receiving antennas, by sampling the received signal over the baud rate of transmission (i.e. over sampling), by separating in-phase (I) and quadrature-phase (Q) of the signal, or by combinations of these. The method of separating in-phase and quadrature-phase of the signal is commonly referred to as single-antenna-interference cancellation (SAIC) and has recently received much attention in the so called GERAN standardization.

In conventional array processing, the interference is typically modeled as temporally (across time) and/or spatially (across different signal versions) colored noise. By performing proper spatial and/or temporal noise whitening, the interference can be suppressed substantially. Such whitening operation may be performed before or during demodulation/equalization.

In order to suppress the noise or interference through spatial-temporal whitening, the receiver typically requires an estimate of a certain spectral property of the noise, such as the noise covariance matrix. From such spectral property, a whitening filter can then be derived to whiten, and therefore suppress, the noise. If the statistics of interference can be assumed to be approximately stationary over the data burst, the estimation of the noise spectral property may be performed over a sequence of training symbols in each data burst that is known to the receiver.

In addition, the demodulator or equalizer of the receiver must also be able to synchronize to the beginning of a data burst in order to begin demodulation. The synchronization process is typically done jointly with channel estimation over the training sequence. When spatial/temporal whitening is performed on the received signal to suppress noise or interference, the operating carrier-to-interference power ratio (C/I) can be changed so drastically that the ordinary method of synchronization and channel estimation, such as the least squares (LS) method, can no longer produce an accurate synchronization position. As a result, the reliability of synchronization and channel estimation becomes a bottleneck of the overall receiver performance.

One known way of improving synchronization and quality of channel estimation in a multi-branch receiver is to first perform a certain initial synchronization and channel estimation, such as the LS channel estimation, and then estimate the noise covariance matrix or function based on the residual signal after channel estimation. From the estimated noise covariance matrix, a whitening filter can be computed using the well-known Whittle-Wiggins-Robinson Algorithm (WWRA). The problem with this approach is that the initial synchronization and channel estimation (before whitening) may not produce an accurate estimate of the synchronization position and the channel estimate. As a result, the statistics of the residual signal obtained from the initial synchronization and channel estimation may not be representative of the statistics of the actual noise or interference.

To overcome this, one known technique [1] is the so called Indirect Spatio-Temporal Interference Rejection Combining (Indirect ST IRC), which is a joint synchronization, channel estimation and noise covariance estimation technique. The use of this technique in the receiver algorithms for BTS or MS results in substantial interference suppression.

The technique described in [1] gives a method to jointly estimate the synchronization position, channel, and noise covariance matrix, given a baseband model for a received signal containing a known training sequence. However, the length of the channel and the dimension of the noise covariance matrix are assumed to be known. The choice of the channel length and the dimension of the noise covariance matrix will be referred to as the model order selection problem in the following detailed description.

Existing solutions to the model order selection problem can be divided into two groups. In the first group, the order of the model is fixed, and can be guessed or deduced from field measurements and subsequently hard coded into the algorithms. In the second group there are the ad hoc methods based on simulations. In this methodology, a statistical regression is used to produce a table. The regression is made from simulation-generated data.

Neither of these two groups is satisfactory. The main disadvantage of choosing a fixed model order is that it lacks the flexibility needed to cope with the diverse deployment scenarios found in mobile networks. The main disadvantage of the ad hoc methods is that the mobile system may be put to work in environments that do not necessarily fit the simulation conditions or the test cases chosen by the system designers.

Therefore, there is a need for improved methods and arrangements for model order selection to enable improved ST IRC.

SUMMARY

A general object of the present invention is to enable an improved telecommunication system.

A further object of the present invention is to provide an improved method of model order selection.

Another object of the present invention is to enable joint determination of a best synchronization position, channel length and model order for a signal model.

These and other objects are achieved by the attached set of claims.

According to a basic embodiment, the present invention comprises generating S0 a spatially and temporally stacked signal model by stacking successive samples of temporally adjacent received signal vectors and corresponding training vectors, computing S1 a noise variance matrix for each hypothesized synchronization position, channel length and stacking order, based on the stacked training symbols: determining S2 a best synchronization position for the received signal, based on the stacked training vectors, by jointly determining the best synchronization position for the received signal and estimating a channel length and a stacking order for said signal model based on the stacked training vectors.

An arrangement according to the invention enables the execution of the method steps.

This is then utilized in subsequent known steps of computing a noise covariance estimate, an estimate of the fictitious channel and an estimate of the whitened channel, to enable an improved interference cancellation in a telecommunication system.

Advantages of the present invention include:
Improved model order selection
Improved joint whitening/synchronization
Low computational complexity
Easy implementation in digital signal processors or other electronic equipment.

BRIEF DESCRIPTION OF THE DRAWINGS

The invention, together with further objects and advantages thereof, may best be understood by making reference to the following description taken together with the accompanying drawings, in which.

ABBREVIATIONS

BTS Base Transceiver Station
EDGE Enhanced Data Rates for Global Evolution
GSM Global System for Mobile Communications
MS Mobile Station
SAIC Single Antenna Interference Cancellation
ST IRC Spatio-Temporal Interference Rejection Combining
TDMA Time Division Multiple Access

DETAILED DESCRIPTION

Figure 1:
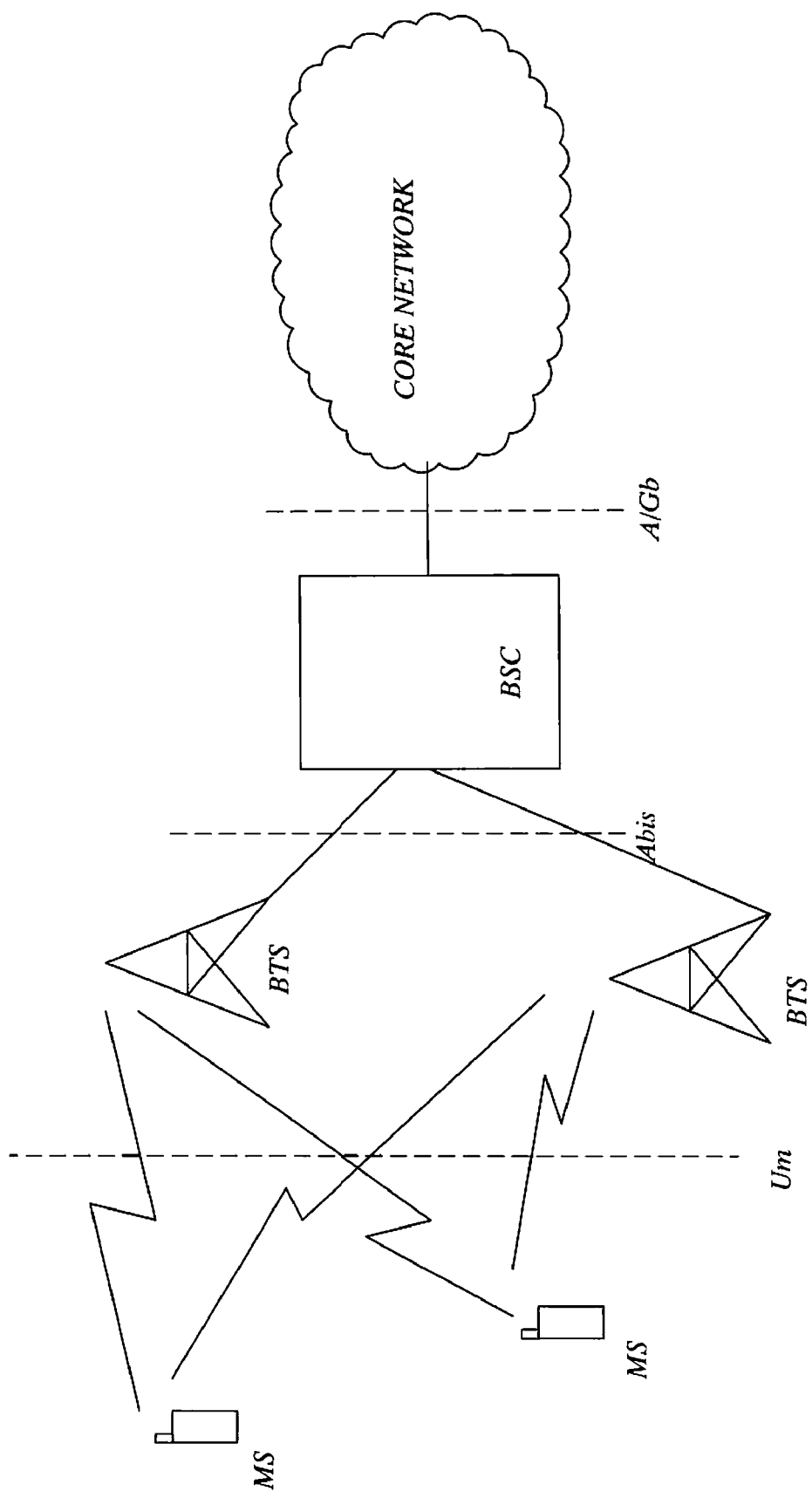
FIG. 1 illustrates a schematic system in which the present invention is applicable.

The present invention will be described with reference to the attached drawings, and in the context of a GSM/EDGE-based telecommunication system as illustrated by FIG. 1. However, it is equally applicable to any other TDMA-based telecommunication system The system in FIG. 1, in a known manner, comprises a core network to which one or more base station controllers (BSC) are associated via the interface A/Gb. Each BSC is associated with one or more base transceiver stations (BTS) via an interface Abis, each such BTS is configured for communicating with one or more mobile stations (MS) over an interface Urn.

One of the criteria of the present invention is the nature of the stacked signal vector to be evaluated. This has been described in WO 2006/136875[1]. In short, the patent document discloses system and a method in a radio receiver for joint synchronization and noise covariance estimation of a received signal. A spatially and temporally stacked signal model, whereby successive samples of temporally adjacent received signal vectors and corresponding training vectors are stacked, is used in the derivation of the estimation problem. The Toeplitz structure of the channel response matrix is neglected in the formulation of the estimation problem. The resulting estimator jointly estimates a synchronization position, a channel response matrix, and a noise covariance matrix. An estimate of a whitened channel is then computed based on the noise covariance matrix and an estimate of the channel response matrix.

As stated previously, the above described method assumes that the channel length and the stacking order or model order are known parameters. The following description of the present invention aims to describe an improved method that jointly provides an estimate of the best synchronization position, the channel length, and the stacking order.

The basic model order selection problem is the following. A data set and an identifiable mathematical model for the data are given. The goal is to obtain the best estimate of the model parameters. If the number of parameters in the model is unknown, then the models with more parameters will always yield a better fit to the known data set than the models with fewer parameters, regardless of the number of parameters in the true model. The order selection problem is to estimate the true number of parameters.

The present invention provides a solution to the model order selection problem for the indirect ST IRC as described in [1], by giving a closed form mathematical expression for an estimate of the model or stacking order. Specifically, a formula for the length of the channel and the dimension of the noise covariance matrix is given.

Model order selection problems arise frequently in many fields of science and engineering. In many cases of practical interest, they can be solved by means of a well-known methodology known as the Akaike Information Criterion [2]. The original work of Akaike has been extended by a number of authors in order to handle multidimensional signals, but always under the assumption that the signal has a known dimension. The ST IRC methodology developed in [1] has the particular feature that the dimension of the received signal is a model parameter. The original multidimensional signal is stacked to form a new, artificial, received signal of even higher dimension. A derivation and explanation as to why Akaike [2] is not applicable in a straight forward manner to signals of possibly varying dimension is shown in Appendix A for the interested reader. The present invention therefore consists of a mathematical expression to estimate the model order for indirect ST IRC [1]. It has been derived though a non-trivial extension of the methodology of Akaike to suit the indirect ST IRC framework. The interested reader is referred to Appendix B for the complete derivation. The main points of the method will be described below.

Embodiments of the present invention will be described with reference to FIG. 2 and FIG. 3.

Figure 2:
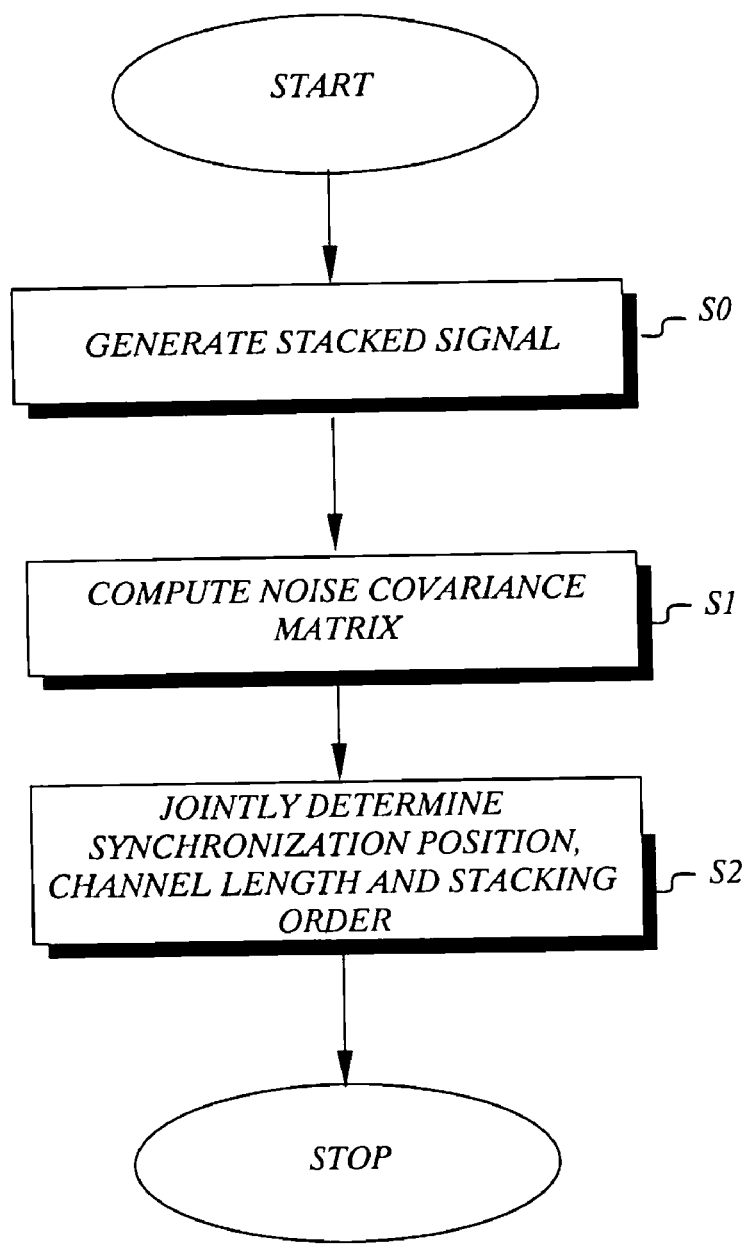
FIG. 2 is a schematic flow chart of an embodiment of a method according to the present invention.

Basically, with reference to FIG. 2, the present invention comprises generating S0 a spatially and temporally stacked signal model by stacking successive samples of temporally adjacent received signal vectors and corresponding training vectors. Subsequently, a noise variance matrix representative of each hypothesized synchronization position, channel length and stacking order is computed S1 based on the generated stacked training symbols. Finally, a best synchronization position for the received signal is determined S2 based on the stacked training vectors by jointly determining the best synchronization position for the received signal and estimating a channel length and a stacking order for said signal model based on the stacked training vectors.

Subsequently, with reference to FIG. 3, the thus jointly determined synchronization position, channel length estimate, and stacking order for the model signal are utilized in subsequent steps of computing a noise covariance estimate S3, computing an estimated of a fictitious channel S4, and computing an estimate of the whitened channel S5 in a known manner.

To further understand the framework of the present invention, an in depth discussion of the mathematics and the derivation of the expressions used is included below.

The Akaike Information Criterion and ST IRC

We begin by stating a version of the Akaike Information Criterion [2] which is the starting point for the present invention. Let Y denote the matrix of received, complex-valued data samples of dimension $N_{branches} \times N_{samples}$. $N_{branches}$ can be thought of as a spatial dimension, whereas $N_{samples}$ is the temporal dimension. For example, $N_{branches}$ could be the number of branches in an antenna array, while $N_{samples}$ could be the number of samples received $$(\overline{\Theta}|_q - \hat{\Theta})^* I(\overline{\Theta}|_q, Y)(\overline{\Theta}|_q - \hat{\Theta}) \qquad (2)$$

is asymptotically distributed as $\chi_{2q}^2$. (Denote the Chi-squared with n degrees of freedom by $\chi_n^2$.) The factor 2 in front of the q stems from the fact that $\Theta$ is a vector of complex quantities. Let $\dim(\hat{\Theta}) = 2q$.

The model selection methodology can be used successfully when different choices of the unknown parameters $\Theta$ yield different numbers of samples $N_{samples}$. i.e. when $N_{samples} = N_{samples}(\Theta)$.

The ST IRC methodology is rather special since there is a dependence between the spatial dimension and the parameter choice. In other words, $N_{branches} = N_{branches}(\Theta)$. However, in this case, Equation (1) does not always result in reasonable parameter choices. The reason for this will be explained in more detail later on. Thus, a straightforward application of the Akaike methodology will not solve the model selection problem for ST IRC.

For the further description, it is necessary with a few preliminary definitions from the disclosure in [1].

Consider the following typical, dispersive multiple-input-multiple output (MIMO) signal model with additive noise:

$$r[n+n_0] = \sum_{k=0}^{L-1} C[k]s[n-k] + v[n], \qquad (3)$$

for $n = L-1, \Lambda, N-1$, where N denotes the length of the training sequence (N=26 for GSM/EDGE), r[n] denotes a $N_r$-dimensional received (column) vector, $n_0$ denotes the synchronization position, which is the time index of in each branch. Assume that p is the pdf (probability distribution function) of Y and that it belongs to a known family parameterized by $\Theta$.

An estimate $\hat{\Theta}$ of $\Theta$ may be chosen according to the following equation.

$$\hat{\Theta} = \arg\min_{\Theta} \frac{1}{N_{samples}} (-\log p(Y|\Theta) + \dim(\Theta)) \qquad (1)$$

where $\dim(\Theta)$ is the number of degrees of freedom associated with the particular parameter vector $\Theta$.

It will be illuminating to review some aspects of the derivation of Equation (1). The following assumptions will be valid throughout the description. Assume that $Y = [Y_1, \ldots, Y_{N_{samples}}]$, where each entry $Y_k$ is a column vector of dimension $N_{branches}$. Assume also that the random vectors $(Y_k)$ are i.i.d. and that $Y_k \approx N(\mu(k, \Theta), Q)$, where Q is an unknown positive definite matrix. Moreover, assume that for each k the function $\mu(k.)$ is a linear function.

The main ingredients in the derivation of Equation (I), starting from the Kullback-Leibler divergence, are the law of large numbers and the asymptotic consistency and normality of the maximum likelihood estimator for vector valued random variables. These are guaranteed by the previously stated assumptions. (The Gaussian pdf and the linear dependence of the mean upon the unknown parameter vector ensure that the smoothness requirements are fulfilled). Denote the true parameter vector by $\overline{\Theta}$.

Akaike discovered [2] that the log-likelihood is a biased estimator of the Kullback-Leibler divergence. He also showed that the bias can be approximated by the dimension of $\hat{\Theta}$. Let $I(\overline{\Theta}, Y)$ be the Fisher information matrix. Assume that $\hat{\Theta}$ consists of q complex parameters. The key estimate is that the quadratic form the first symbol of the training period, $\{C[k]\}$ denotes a N, by N, MIMO channel response of length L, $\{s[n]\}$ denotes possibly $N_t$-dimensional training vector, and $\{v[n]\}$ denotes a spatially and temporally colored noise process used to model the interference. Also, let $\Gamma$ denote a (finite) set of possible sync positions.

A stacked vector notation will be employed in the following description. Let $r^{M-1}[n]$ a vec$([r[n], r[n-1], \Lambda r[n-M]])$ be a vector formed by stacking $\{r[k]\}_{k=n-M}^{n}$ in columns, where M denotes the model order or "stacking order", and for any matrix A, vec(A) is the vector formed by stacking columns of A one by one into a single vector, i.e. using typical Matlab notation, vec(A) a A(:). Similarly, let $v^{M+1}[n] \equiv \text{vec}([v[n], v[n-1,], \Lambda v[n-M]])$ denote the corresponding stacked noise vector, and $s^L[n] = \text{vec}([s[n], s[n-1,], \Lambda, s[n-L+1]])$ denote the corresponding stacked training vector.

Rewriting the signal model in Equation (3) by stacking (M+1) temporally adjacent received vectors, provides the following stacked signal model:

$$r^{M-1}[n+n_0] = T(C)s^{L+M}[n] + v^{M+1}[n], \qquad (4)$$

where $$T(C) \equiv \begin{bmatrix} C[0] & C[1] & \Lambda & C[L-1] & 0 & \Lambda & 0 \\ 0 & C[0] & C[1] & \Lambda & C[L-1] & 0 & M \\ M & M & M & M & M & M & M \\ M & 0 & C[0] & C[1] & \Lambda & C[L-1] & 0 \\ 0 & \Lambda & 0 & C[0] & C[1] & \Lambda & C[L-1] \end{bmatrix} \qquad (5)$$

is an (M+1)×(L+M) block Toeplitz matrix of block size $N_r \times N_t$. A key model assumption is that the (expanded) noise vector process $\{v^{M+1}[n]\}$ is independent and identically distributed (IID), and let $\Lambda \equiv E[v^{M+1}[n](v^{M+1}[n])^H]$ be the covariance matrix of $v^{M+1}[n]$.

According to [1], given L, M, $n_0$, the covariance matrix $\hat{\Lambda}$ can be estimated by $$\hat{\Lambda}(L, M, n_0) = \sum_{n=L+M-1}^{N-1} r^{M+1}[n+n_0](r^{M+1}[n+n_0])^H - \quad (6)$$

$$\left[\sum_{n=L+M-1}^{N-1} r^{M+1}[n+n_0](s^{L+M}[n])^H\right]\left[\sum_{n=L+M-1}^{N-1} s^{L+M}[n](s^{L+M}[n])^H\right]^{-1}$$

$$\left[\sum_{n=L+M-1}^{N-1} s^{L+M}[n](r^{M+1}[n+n_0])^H\right].$$

The model order selection problem for Indirect ST IRC [1] solved by the present invention consists of estimators $\hat{L}$, $\hat{M}$ for L, M. As usual, the symbol $\hat{\ }$ on top of a quantity denotes an estimator of said quantity.

Without loss of generality assume that the stacking order M is limited to the values $M_0=0<M_1<\Lambda<M_m=M_{max}$ and that $M_{max}+1$ is divisible by $M_k+1$ for all $0<k<m$. (Given any desired set of stacking orders $M_0=0<M_1<\Lambda<M_n$, it is always possible to define $$M_{n+1} = M_{max} = \prod_{p=1}^{n}(M_p+1) - 1,$$

and the hypothesis is fulfilled.) Assume also that the channel length L is one of the positive integers $L_0<L_1<\Lambda<L_p$.

Next, define the integers $$\gamma(M) = \frac{M_{max}+1}{M+1}, \text{ for } M = M_k, 0 \le k \le m. \quad (7)$$

The channel length and the stacking order are chosen according to the following expression, which also gives the synchronization position.

$$[\hat{L}, \hat{M}, \hat{n}_0] = \quad (8)$$

$$\operatorname*{argmin}_{\substack{L=L_q: 0 \le q \le p \\ M=M_k: 0 \le k \le m \\ n_0 \in \Pi}} \left\{ |\hat{\Lambda}(L, M, n_0)|^{\gamma(M)} \left( \exp\left( \frac{p(L, M)}{N-L+1-M} \right)^{(M_{max}+1)N_r} \right) \right\},$$

where p(•,•) is a cost function and the parallel bars ∥ denote the determinant of a matrix. The use of the methodology of Akaike [2] yields the cost function $$p(L,M)=2L+2M. \quad (9)$$

In order to obtain more flexibility in the model choice it is possible to change the cost function. For example $p(L,M) = C_1L+C_2M$, where $C_1$, $C_2$ are constants. Other choices of the penalty function are possible, based on simulations or heuristics.

Note that the expression in brackets in Equation (8) can be replaced by any monotone increasing function or mapping of it, and the same results will be obtained. This could be advantageous for numerical reasons. For example. Equation (8) is equivalent to the expression below:

$$[\hat{L}, \hat{M}, \hat{n}_0] = \quad (10)$$

$$\operatorname*{argmin}_{\substack{L=L_q: 0 \le q \le p \\ M=M_k: 0 \le k \le m \\ n_0 \in \Pi}} \left\{ |\hat{\Lambda}(L, M, n_0)|^{\frac{1}{(M+1)N_r}} \exp\left(\frac{p(L, M)}{N-L+1-M}\right) \right\}.$$

Note that Equation (10) is independent of $M_{max}$. The complete derivation of Equation (8) is given in Appendix B attached to this disclosure.

To further support and illustrate the impact of the present invention, a series of simulations have been performed.

Figure 4:
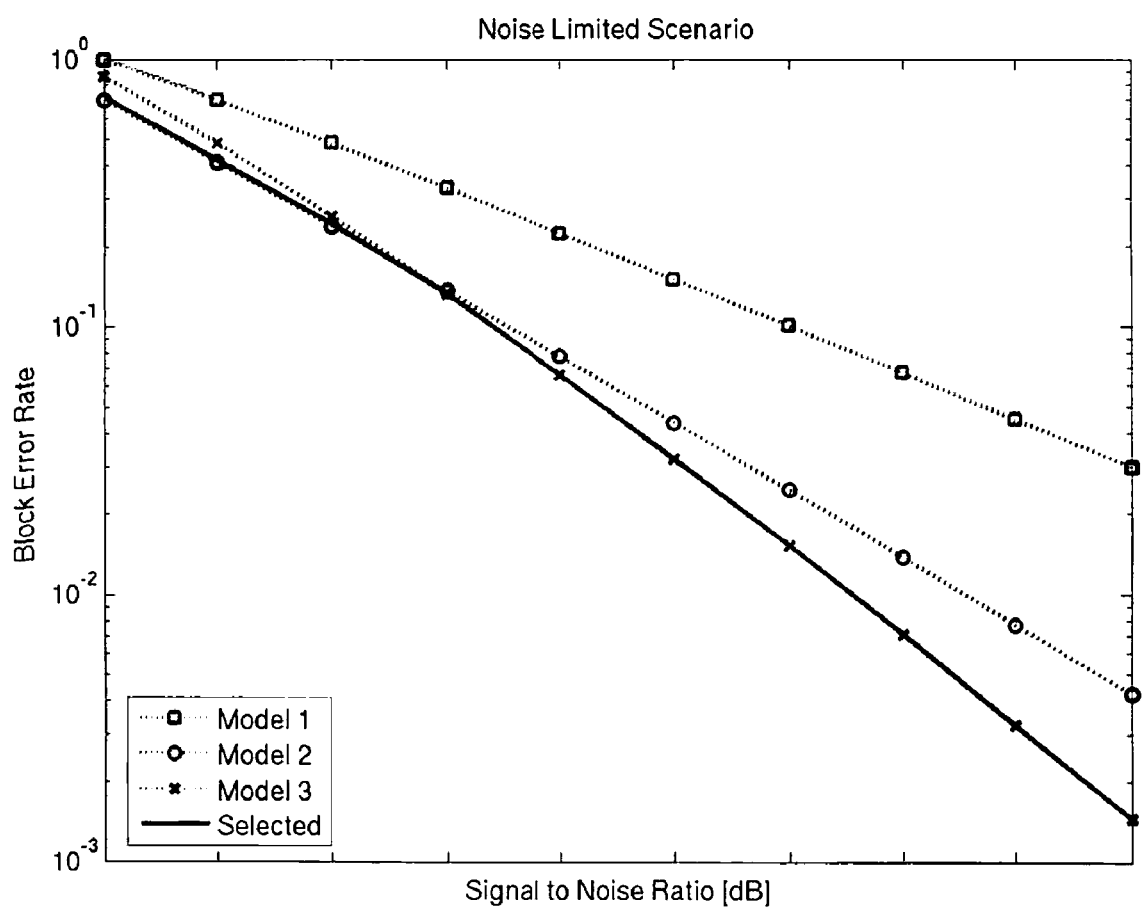
FIG. 4 is a diagram illustrating the relation between BLER and SNR in a sensitivity limited environment and how embodiments of the present invention enables an intelligent choice of the best model for different environmental conditions.

FIG. 4 illustrates the relation between Block Error Rate (BLER) and Signal to Noise ratio (SNR) for various models in a sensitivity limited environment and how the present invention enables an intelligent choice of the best model for different environmental conditions. The different lines represent different combinations of channel length and stacking order. From the diagram, it is obvious that the different models behave differently with different SNR. By utilizing the invention (with variable stacking order) it is possible to always attain the best model choice (as indicated by the solid line). If a fixed model had been used, the result would be differently (as illustrated by the various dotted lines).

Figure 5:
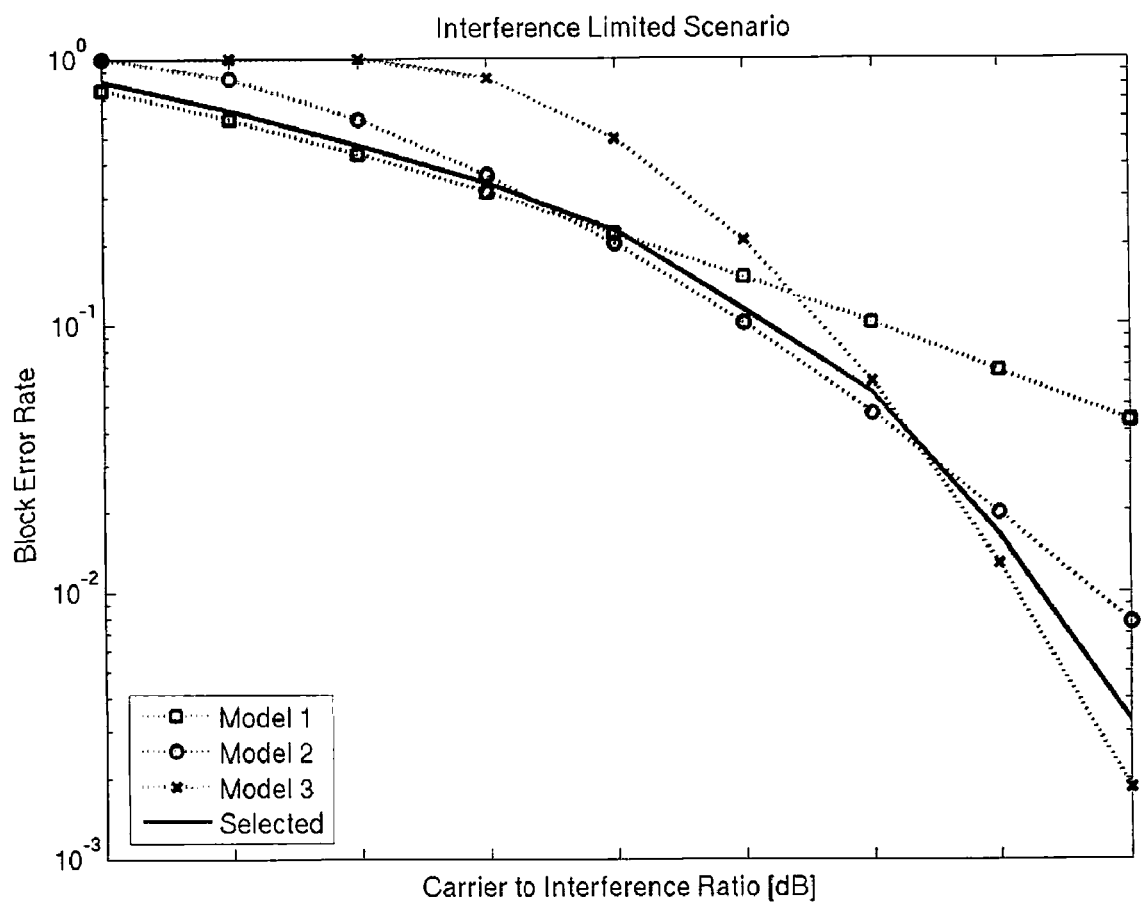
FIG. 5 is a diagram illustrating the relation between BLER and C/I for various models in an interference limited environment and how the present invention enables an intelligent choice of the best mode for different environment conditions.

Similarly, FIG. 5 illustrates how BLER varies with Carrier to Interference ratio (C/I) for an interference dense environment.

Figure 6:
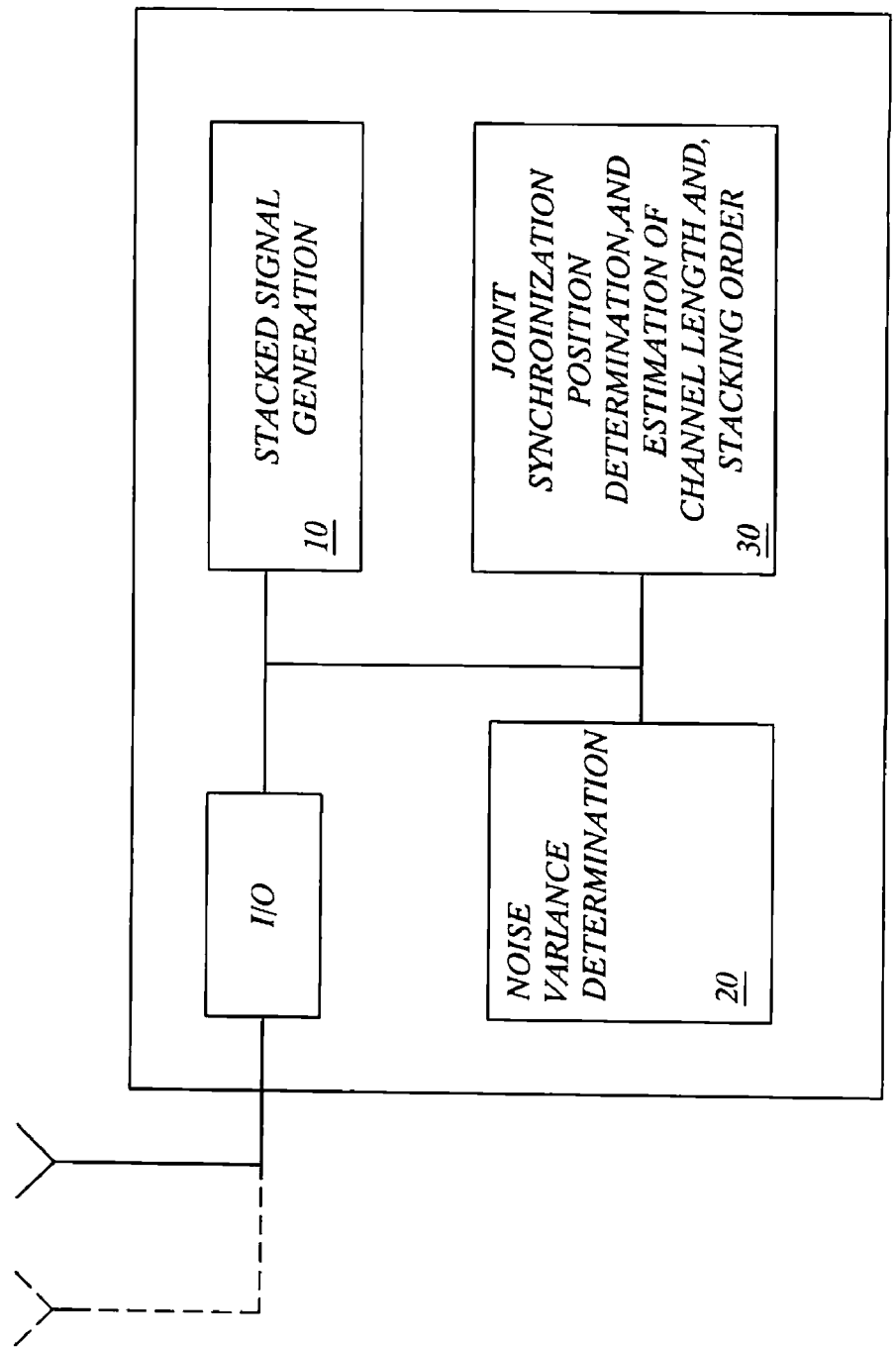
FIG. 6 illustrates an arrangement according to an embodiment of the present invention.

An arrangement according to the invention will be described with reference to FIG. 6. The arrangement is configured for receiving signals over one or multiple antennas (as indicated by the dotted lines) through a general input/output unit I/O. Further, the arrangement comprises a unit 10 for generating a stacked signal model by stacking successive samples of spatially and temporally adjacent received signal vectors and corresponding training vectors. The samples typically comprise input from different antennae. In addition, the arrangement comprises a computational unit 20 for computing a noise covariance matrix for each combination of hypothesized synchronization position, channel length and stacking order based on the previously provided stacked training symbols. The computational unit 20 is further adapted to compute the covariance matrixes in such a manner as to neglect the Toeplitz structure of the channel. Finally, the arrangement according to the invention comprises a unit 30 for determining a best synchronization position for the received signal, based on the stacked training vectors. The determining unit 30 is configured for jointly determining the synchronization position, a channel length estimate, and a stacking order of the signal model. Thus, the arrangement is configured for providing a "triplet" of model parameters.

The methods and arrangement according to the invention can be implemented in the receivers of base transceiver stations or in the mobile stations, or in some other part of the system where a receiver algorithm is applied. Further, the MS or BTS may be provided with one or more antennas.

The known method of joint whitening/synchronization disclosed in [1] have great potential for example in receiver algorithms for upcoming GSM/EDGE dual antenna terminals or in the BTS receiver algorithms for Evolved EDGE. However, the order of the model is unknown in practical applications in wireless communications. The present invention provides a statistic for the model order selection problem based on accepted statistical methodology. The statistic has low computational complexity and is easy to implement in digital signal processors or other electronic circuitry.

It will be understood by those skilled in the art that various modifications and changes may be made to the present invention without departure from the scope thereof, which is defined by the appended claims.

REFERENCES

1. Patent application WO2006/136875 "Method of Joint Synchronization and Noise Covariance Estimation based on a Spatially and Temporally Stacked Signal Model".
[2] Akaike, Hirotugu (1974). "*A new look at the statistical model identification*". IEEE Transactions on Automatic Control 19 (6): 716-723.

APPENDIX A

Fixed Stacking Order

Consider a fixed stacking order M and derive a statistic to choose the length of the channel impulse response, e.g. channel length.

The model selection problem for ST IRC is about finding a suitable estimate of H which is the (fictious) channel impulse response. To be specific, assume that the stacking order is $M \geq 0$, the channel has L+1 taps, there are $N_{tr}$ training symbols s, the synchronization position is $n_0$, and the received signal y has $N_r$ branches. Writing $$y^M(n) = \begin{bmatrix} y(1, n+n_0) \\ M \\ y(N_r, n+n_0) \\ M \\ y(1, n+n_0-M) \\ M \\ y(N_r, n+n_0-M) \end{bmatrix}, \quad (A1)$$

$$v^M(n) = \begin{bmatrix} v(1,n) \\ M \\ v((M+1)N_r, n) \end{bmatrix}, \quad (A2)$$

and $$s^M(n) = \begin{bmatrix} s(n) \\ M \\ s(n-L-M) \end{bmatrix}, \quad (A3)$$

the ST IRC signal model is the following $$y^M(n) = \begin{bmatrix} H(1,0) & K & H(1, L+M) \\ M & & M \\ H((M+1)N_r, 0) & \Lambda & H((M+1)N_r, L+M) \end{bmatrix} s^M(n) + v^M(n), \quad (A4)$$

$$n = L+M, \Lambda, N_{tr} - 1$$

where the residuals $v^M(n)$ are i.i.d. and have an $N_r(M+1) \times N_r(M+1)$ covariance matrix $\Lambda$ $$Q_M = E[v^M(n)v^M(n)^*] \quad (A5)$$

This model can also be written in matrix form $$Y = HS + V \quad (A6)$$

As usual S denotes a suitable Toeplitz matrix of training symbols and H is the fictious stacked channel matrix. The dimension of Y is $N_r(M+1) \times (N_{tr}-L-M)$. The dimension of H is $(M+1)N_r \times (L+1+M)$. The matrix V has the same dimension as Y. The columns of V are complex Gaussian, i.i.d., zero mean with (unknown) covariance $\Lambda_M$.

The assumptions imply that the columns of Y are i.i.d. complex Gaussian with covariance $\Lambda_M$ and non-zero mean. The mean is given by the columns of HS. Therefore $$p(Y|H, \Lambda_M) = (\pi^{-N_r(M+1)}|\Lambda_M|^{-1}\exp(-tr(\hat{\Lambda}_M \Lambda_M^{-1})))^{N_{samples}}, \quad (A7)$$

where $$N_{samples} = N^{tr} - L - M \quad (A8)$$

and $$\hat{\Lambda}_M = \frac{1}{N_{samples}}(Y - HS)(Y - HS)^*, \quad (A9)$$

Note that $\hat{\Lambda}_M$ is dependent on H. We can now write the log-likelihood $$-\log p(Y|H, \Lambda_M) = [N_r(M-1)\log \pi - \log|\Lambda_M| - tr(\hat{\Lambda}_M \Lambda_M^{-1})]N_{samples} \quad (A10)$$

For any given H the expression on the left hand side of (A10) is minimized by taking $\Lambda_M = \hat{\Lambda}_M$. Moreover, using the indirect ST IRC algorithm [1] we find an estimate $\hat{H}^D$ of H that maximizes the log-likelihood, or equivalently $-\log|\Lambda_M|$. Let's call $\hat{\Lambda}_M^D$ the sample covariance matrix associated with $\hat{H}^D$. We then compute $$\min_{H \cdot Q_M} \{-\log p(Y | H \cdot \Lambda_M)\} = \quad (A11)$$

$$\left[N_r(M+1)\log \pi + \log|\hat{\Lambda}_M^D| + tr(I_{N_r(M+1)})\right]N_{samples} =$$

$$\left[N_r(M+1)\log \pi + \log|\hat{\Lambda}_M^D| + N_{r(M+1)}\right]N_{samples}$$

Using Equation (1) and Equation (A11) and eliminating the terms independent of L we arrive at the expression $$\hat{L} = \underset{L}{\operatorname{argmin}}\left(\log|\hat{\Lambda}_M^D| + \frac{dim(\hat{H}^D)}{N_{samples}}\right) \quad (A12)$$

In order to avoid the calculation of logarithms we take exponential in Equation (A12).

$$\hat{L} = \underset{L}{\operatorname{argmin}}|\hat{\Lambda}_M^D|e^{\frac{dim(\hat{H}^D)}{N_{samples}}} \quad (A13)$$

Next we calculate $dim(\hat{H}^D)$. This is straightforward, with the warning that one complex parameter is counted as 2 (real parameters). We obtain $dim(\hat{H}^D) = 2(M+1)N_r(L+1+M)$. This gives $$\hat{L} = \underset{L}{\operatorname{argmin}}|\hat{Q}_M^D|e^{\frac{2(M+1)N_r(L+1+M)}{N_{samples}}} \quad (A14)$$

Defining the Quantity $$AIC(L) = \left(e^{\frac{2(L+1+M)}{N_{tr}-L-M}}\right)^{(M+1)N_r} \quad (A15)$$

we obtain $$\hat{L} = \underset{L}{\operatorname{argmin}} |\hat{Q}_M^D| \cdot AIC(L) \quad (A16)$$

APPENDIX B

Variable Stacking Order

Although the mathematical calculations of the previous subsection can be carried out for variable stacking order M, the result is not useful because the methodology breaks down. To see why, let's look at Equations (1) and (A11). As usual, given any positive integer p, we will call $I_p$ the identity matrix of dimension p×p. In sensitivity scenarios $\hat{\Lambda}_M^D \approx \sigma^2 I_{N_r(M+1)}$, where $\sigma^2$ is the noise power. Therefore $|\hat{\Lambda}_M^D| \approx \sigma^{2N_r(M+1)}$. Thus, as $\sigma^2 \to 0$ determinant of the matrix with the largest stacking order M will dominate all other terms in the minimization in Equation (1). Consequently, for sufficiently small $\sigma^2$ the highest stacking order will always be chosen, even in sensitivity cases.

This difficulty can be solved as follows. Let us say that only the stacking orders $M_0 = 0 < M_1 < \Lambda < M_m = M_{max}$ are allowed. Without loss of generality we assume that $M_m + 1$ is divisible by $M_k + 1$ for all $0 < k < m$. (Given any desired set of stacking orders $M_0 = 0, \ldots, M_k$ we can always add $M_{k+1} = M_{max} = \lceil \prod_{p=1}^{k}(M_p+1)-1 \rceil$. The stacked model of order $M_k$ can be embedded in the stacked model of order $M_{max}$. For convenience, define the integers $\gamma_k$ $$\gamma_k = \frac{M_{max}+1}{M_k+1}, k = 0, \Lambda, m \quad (B1)$$

and the fictious or hypothesized stacked channel matrices $H_k$ $$H_k = \begin{bmatrix} H(1,0) & \Lambda & H(1, L+M_k) & 0_{1 \times (M_{max}-M_k)} \\ M & & & M \\ 0_{1 \times (M_{max}-M_k)} & H((M_{max}+1)N_r, 0) & \Lambda & H((M_{max}+1)N_r, L+M_k) \end{bmatrix} \quad (B2)$$

where $k=0, \ldots, m$ of dimension $(M_{max}+1)N_r \times (L+1+M_{max})$. The expression $0_{1 \times (M_{max}-M_k)}$ denotes a matrix of zeros in dimension $1 \times (M_{max}-M_k)$.

Using the notation introduced in the previous section, the stacked model for order $M_k$ embedded in the higher dimension $M_{max}$ can be written in the form $$y_k^{M_{max}}(n) = H_k s^{M_{max}}(n) + v^{M_{max}}(n) \quad (B3)$$

with the assumption that the covariance matrix $$\Lambda_k = E[v^{M_{max}}(n) \cdot v^{M_{max}}(n)^*] = I_{\gamma_k} \otimes \Lambda_{M_k} \quad (B4)$$

Here $\otimes$ is the Kronecker product and $\Lambda_{M_k}$ is the $(M_k+1)N_r \times (M_k+1)N$, covariance matrix of the stacked model of order $M_k$.

Notice that this embedded version is not identical to the original formulation and that we have not imposed any structural constraints on $H_k$. In fact. $H_k$ is composed of $\gamma_k$ (possibly) different sub-matrices, all of which are convergent to the channel of stacking order $M_k$ as $N_{samples} \to \infty$. Because of this we say that the two formulations are asymptotically equivalent. The difference between the original and the embedded formulations is due to border effects, since the stacking reduces the number of used samples in the temporal dimension.

Now, we can apply the methodology developed in the previous subsection to the embedded models, since all the model candidates have the same spatial dimension $(M_{max}+1)N_r$. Exactly the same argument leading to Equation (A13) yields $$[L, M_k] = \underset{L,k}{\operatorname{argmin}} |\hat{\Lambda}_k^D| \exp\left(\frac{dim(\hat{H}_k^D)}{N_{samples}}\right) \quad (B5)$$

Recall that $\hat{\Lambda}_k^D$ is block diagonal. Hence $$|\hat{\Lambda}_k^D| = |\hat{\Lambda}_{M_k}^D|^{\gamma_k} \quad (B6)$$

Moreover, $$dim(\hat{H}_k^D) = 2(M_{max}+1)N_r)(L+1+M_k) \quad (B7)$$

Hence Equation (B5) can be rewritten as $$[\hat{L}, \hat{M}_k] = \underset{L,k}{\operatorname{argmin}} |\hat{\Lambda}_{M_k}^D|^{\gamma_k} e^{\frac{2N_r(M_{max}+1)(L+1+M_k)}{N_{samples}}} \quad (B8)$$

Finally, defining the factor $$AIC(L, M_k) = \left(e^{\frac{2(L+1+M_k)}{N_{tr}-L-M_k}}\right)^{(M_{max}+1)N_r} \quad (B9)$$

we arrive at the statistic $$[\hat{L}, \hat{M}_k] = \underset{L,k}{\operatorname{argmin}} |\hat{\Lambda}_{M_k}^D|^{\gamma_k} AIC(L, M_k) \quad (B10)$$

In practice it is desirable to have some flexibility in the choice of the channel lengths or stacking orders, in order to favor/punish some particular parameter sets. Thus Equation (B9) can be modified as follows.

$$AIC(L, M_k) = \left(e^{\frac{penalty(L,M_k)}{N_{tr}-L-M_k}}\right)^{(M_{max}+1)N_r} \quad (B11)$$

where penalty(•,•) is some cost function. A simple choice in is the linear function $$penalty(L,M) = L_{AIC} \cdot (L+1) + M_{AIC} \cdot M \quad (B12)$$

for suitable constants $L_{AIC}$ and $M_{AIC}$. The values $L_{AIC}=2$, $M_{AIC}=2$ give back Equation (B9). These constants can also be tuned through simulations.

Observe that the term $|\hat{\Lambda}_{M_k}^D|^{\gamma_k} AIC(L,M_k)$ on the right hand side of Equation (B11) may be replaced with $f(|\hat{\Lambda}_{M_k}^D|^{\gamma_k} AIC(L,M_k))$ for any monotonically increasing function $f$, without altering the model choice. This can be useful when performing the calculations in the target. For example, using $f(x)=x^\alpha$ with $$\alpha = \frac{1}{(M_{max}+1)N_r},$$

it can be seen that Equation (B11) is equivalent to $$[\hat{L}, \hat{M}_k] = \underset{L,k}{\operatorname{argmin}} |\hat{\Lambda}_{M_k}^D|^{\frac{1}{(M_k+1)N_r}} \left( e^{\frac{penalty(L,M_k)}{N_{tr}-L-M_k}} \right) \quad \text{(B13)}$$

Note that Equation (B13) is independent of $M_{max}$.

Since Equation (1) is itself based on an asymptotic approximation, a model selection criterion for the embedded models should also be valid for the original (i.e. not embedded) stacked models.

The invention claimed:

1. A method of enabling model order selection for joint channel synchronization and noise covariance estimation of at least one received signal in a wireless communication network, said method comprising:
 generating a spatially and temporally stacked signal model by stacking successive samples of temporally adjacent received signal vectors and corresponding training vectors;
 computing a noise variance matrix for each hypothesized synchronization position, channel length and stacking order, based on the stacked training symbols; and
 determining a best synchronization position for the received signal, based on the stacked training vectors;
 wherein said determining comprises jointly determining the best synchronization position for the received signal and estimating a channel length and a stacking order for said signal model based on the stacked training vectors.

2. The method of claim 1, wherein said determining comprises:
 defining a model parameter dependent on a stacking order of said generated stacked signal model; and
 calculating an estimate of the channel length, the stacking order and the best synchronization position based on a minimum of a function dependent of the determinant of said noise covariance matrix, said model parameter and a penalty function.

3. The method of claim 2, wherein said determining further comprises:
 calculating the estimate of the channel length, the stacking order, and the best synchronization position based on a minimum of a function dependent of the determinant of said noise covariance matrix to the power of said model parameter and a predetermined exponential function dependent on a penalty function.

4. The method of claim 3, further comprising calculating said estimate of the channel length, the stacking order and the best synchronization position based on a minimum of any monotonically increasing mapping of said function.

5. The method of claim 3, wherein said penalty function p(L,M) is a positive function of L and M, where L is the channel length, and M is the stacking order.

6. The method of claim 5, wherein said penalty function p(L,M) is represented by the expression $$p(L,M)=CL+DM,$$

where C, D are positive constants, L is the channel length, and M is the stacking order.

7. The method of claim 6, wherein C=2 and D=2.

8. The method of claim 2, wherein said model parameter $\gamma(M)$ is represented by the expression $$\gamma(M)=1/((M+1)N_r)$$

where M is the stacking order, and $N_r$ is the number of branches in the received signal.

9. A receiver arrangement configured for enabling model order selection for joint channel synchronization and noise covariance estimation of at least one received signal in a wireless communication network, said receiver arrangement comprising:
 a stacking circuit configured for generating a spatially and temporally stacked signal model by stacking successive samples of temporally adjacent received signal vectors and corresponding training vectors;
 a noise variance estimation circuit configured for computing a noise variance matrices for all hypothesized synchronization positions, channel lengths and stacking orders, based on the stacked training symbols;
 a synchronization determining circuit configured for determining a best synchronization position for the received signal, based on the stacked training vectors; and
 wherein said synchronization determining circuit is configured for jointly determining the best synchronization position for the received signal and estimating a channel length and a stacking order for said signal model based on the stacked training vectors.

10. The receiver arrangement of claim 9, wherein said receiver arrangement comprises a mobile station receiver arrangement implemented in a mobile station configured for operation in the wireless communication network.

11. The receiver arrangement of claim 10, wherein said receiver arrangement comprises a base station receiver arrangement implemented in a base station configured for operation in the wireless communication network.

* * * * *

UNITED STATES PATENT AND TRADEMARK OFFICE
CERTIFICATE OF CORRECTION

| | | |
|---|---|---|
| PATENT NO. | : 8,229,050 B2 | Page 1 of 1 |
| APPLICATION NO. | : 12/601568 | |
| DATED | : July 24, 2012 | |
| INVENTOR(S) | : Lopez et al. | |

It is certified that error appears in the above-identified patent and that said Letters Patent is hereby corrected as shown below:

On the Title Page, in Item (75), under "Inventors", in Column 1, Line 2, delete "Almqvist," and insert -- Almquist, --, therefor.

Figure 3:
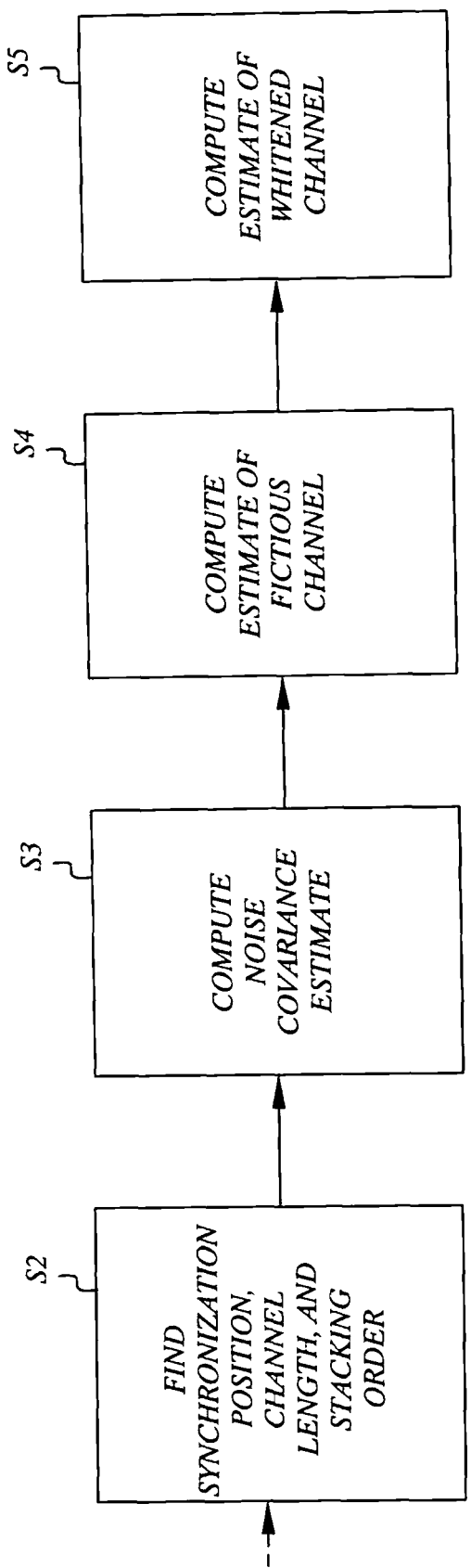
FIG. 3 is another schematic flow chart of an embodiment of a method according to the present invention in relation to prior art.

In Fig. 3, Sheet 3 of 6, for Tag "S4", in Line 3, delete "FICTIOUS" and insert -- FICTITIOUS --, therefor.

In Column 3, Line 30, delete "applicable:" and insert -- applicable; --, therefor.

In Column 3, Line 32, delete "invention:" and insert -- invention; --, therefor.

In Column 3, Line 35, delete "art:" and insert -- art; --, therefor.

In Column 3, Lines 39-40, delete "conditions:" and insert -- conditions; --, therefor.

In Column 3, Line 44, delete "conditions;" and insert -- conditions; and --, therefor.

In Column 6, Line 16, delete "(I)," and insert -- (1), --, therefor.

In Column 9, Line 20, delete "(fictious)" and insert -- (fictitious) --, therefor.

In Column 9, Line 63, delete "fictious" and insert -- fictitious --, therefor.

In Column 11, Line 36, delete "fictious" and insert -- fictitious --, therefor.

Signed and Sealed this
Twenty-seventh Day of November, 2012

David J. Kappos
*Director of the United States Patent and Trademark Office*